G. ALEXOVITS.
DEVICE FOR LOCATING SUNKEN SHIPS.
APPLICATION FILED NOV. 2, 1918.
1,337,383.
Patented Apr. 20, 1920.
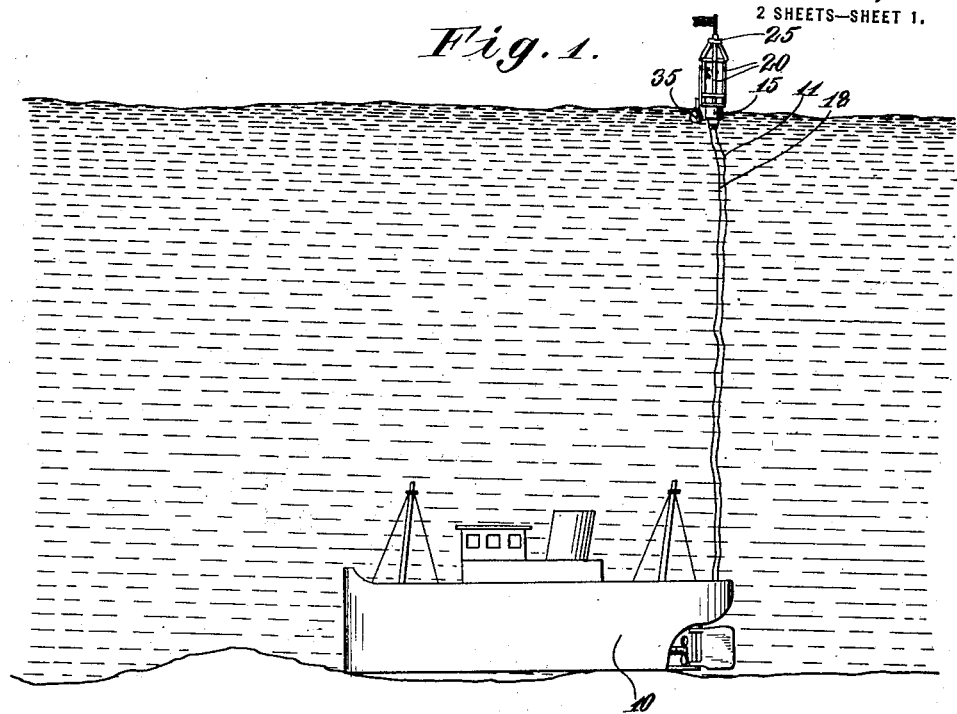
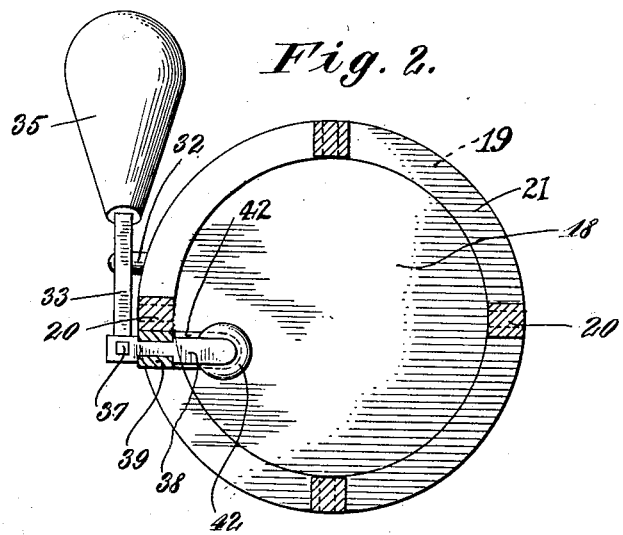
INVENTOR
Gregor Alexovits.
BY
his ATTORNEY

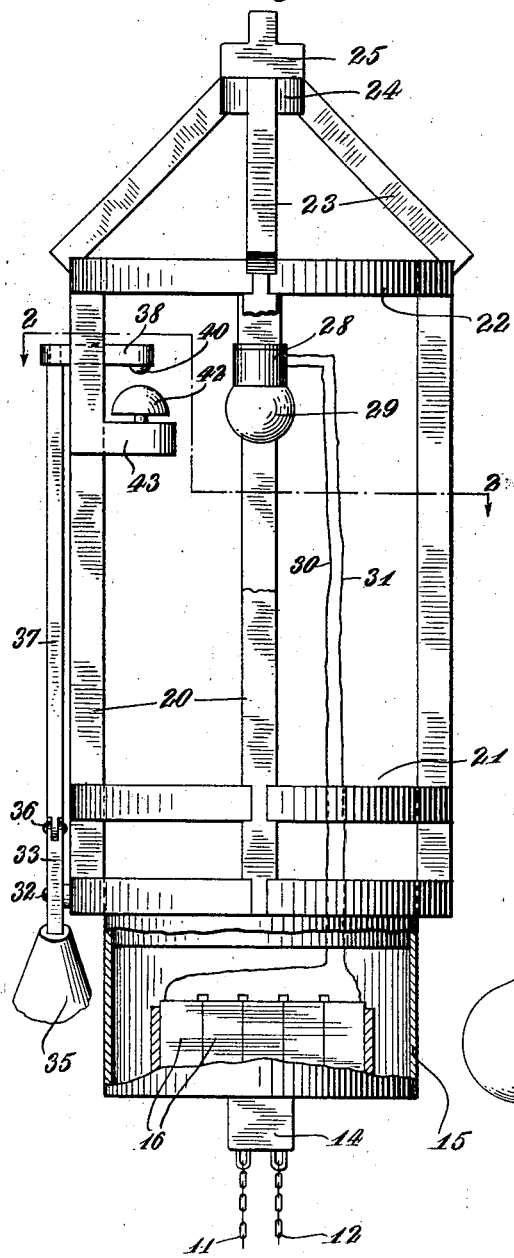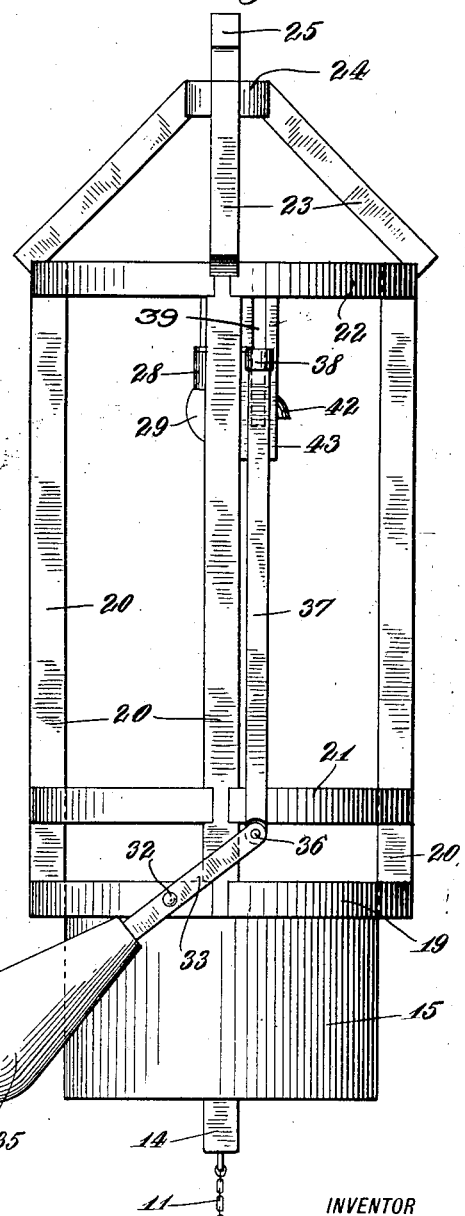

UNITED STATES PATENT OFFICE.

GREGOR ALEXOVITS, OF GUTTENBERG, NEW JERSEY.

DEVICE FOR LOCATING SUNKEN SHIPS.

1,337,383.　　　　Specification of Letters Patent.　　Patented Apr. 20, 1920.

Application filed November 2, 1918. Serial No. 260,902.

*To all whom it may concern:*

Be it known that I, GREGOR ALEXOVITS, a subject of the King of Hungary, residing at Guttenberg, county of Hudson and State of New Jersey, have invented certain new and useful Improvements in Devices for Locating Sunken Ships, of which the following is a specification.

This invention relates to improvements for indicating the position or location of sunken ships. The principal object of the invention is to provide a buoy which will become automatically disengaged upon the sinking of a ship, rising to the surface so that the position of the ship may be disclosed.

A further object is to provide a light which is caused to continuously glow by electricity generated by a storage battery carried in the lower portion of the buoy, and Finally, to provide a buoy which indicates its position audibly by a bell arranged to be operated by the action of the waves.

These and other like objects are attained by the novel construction and combination of parts hereinafter described and shown in the accompanying drawing, forming a material part of this disclosure, and in which—

Figure 1 is a side elevational view of a sunken ship, and its connections with a signal float made in accordance with the invention.

Fig. 2 is a transverse sectional view taken on line 2—2 of Fig. 3.

Fig. 3 is a side elevational view of the float, drawn to an enlarged scale, parts being broken away to show the interior, and Fig. 4 is a similar view taken in another plane.

Referring to Fig. 1 of the drawing a conventional type of ship 10, is seen to be resting upon the soil at the bottom of a body of water, and rising therefrom are cables 11 and 12 respectively, connecting with a block 14, extending downward from a hollow cylindrical casing 15, containing a plurality of storage batteries 16, the same being placed in the lower portion of the casing, so as to cause the same to stand normally erect, the casing being of sufficient buoyancy to cause the same to float upon the surface of the water, it being further understood that the casing is air and water tight.

At the upper part of the casing is an enlarged circular plate 18, to which is secured a marginal band 19, and firmly engaged in the band are uprights 20, connected by another band 21, the uprights extending to a top band 22, from which rise diagonal bars 23, connected with a ring 24, and extending element 25, forming a skeleton structure.

Depending from the ring 25 are supports carrying a lamp socket 28, with which is engaged a lamp 29, wires 30 and 31 communicating between the opposite poles of the storage battery to the lamp socket in an ordinary manner, the current conveyed by the wires causing the lamp to glow brilliantly in a manner readily understood.

Pivoted on the lower band 19, by the pin 32, is a lever 33, its lower end being engaged in a wooden float 35, formed in the shape of a handle and adapted to make contact with the surface of the water, so as to be raised and lowered thereby, the opposite end of the lever 33 being engaged by the pin 36, with a bar 37, extending upward alongside one of the supporting columns 20, and having secured at its upper end, a short transverse bar 38, movable vertically in a guide 39, attached to one of the vertical columns and provided with a downwardly extending knob 40, adapted to make contact with the upper surface of a bell 42, secured upon an inwardly projecting bracket 43.

In operation, should the vessel sink, the buoy will be made to rise automatically after an electrical connection has been established between the wires 30 and 31 by screwing the lamp 29 home into its socket 28 which will cause the lamp 29 to glow. When riding upon the surface of the water, the action of the waves will cause the handle float 35 to automatically rise and fall, and this motion is transmitted to the vertical bar 37, so that the knob 40 will make and break contact with the bell 42, which will thus alternatingly give an audible signal which can be heard for a considerable distance owing to the relatively great height of the bell above the water level.

Having thus described my invention, what I claim as new and desire to secure by Letters Patent, is—

A device for locating sunken vessels comprising in combination with a buoy having an upright frame, a bracket secured to said frame, a bell upon said bracket, a guiding means attached to said frame, a transverse bar moving vertically in said guiding means, a downwardly extending knob on one end of said transverse bar adapted to make contact with said bell, a vertical bar secured to the other end of said transverse bar, a lever at the free end of said vertical bar and a float on said lever adapted to rise and fall with the waves and cause said knob to strike said bell, substantially as described.

In testimony whereof I have affixed my signature.

GREGOR ALEXOVITS.